(12) United States Patent
Johnson

(10) Patent No.: US 8,905,540 B2
(45) Date of Patent: Dec. 9, 2014

(54) EYEGLASSES WITH INTERCHANGEABLE CHARACTER EYES

(76) Inventor: Keith E. Johnson, Colorado Springs, CO (US)

( * ) Notice: Subject to any disclaimer, the term of this patent is extended or adjusted under 35 U.S.C. 154(b) by 0 days.

(21) Appl. No.: 13/493,660

(22) Filed: Jun. 11, 2012

(65) Prior Publication Data

US 2013/0329180 A1   Dec. 12, 2013

(51) Int. Cl.
*G02C 11/02* (2006.01)

(52) U.S. Cl.
CPC ..................................... *G02C 11/02* (2013.01)
USPC ............................................ 351/52; 351/51

(58) Field of Classification Search
CPC .... G02C 5/008; G02C 2200/12; G02C 5/146; G02C 9/04; G02C 1/10; G02C 2200/02; G02C 2200/08; G02C 5/001; G02C 5/006; G02C 7/08; G02C 9/00
USPC .......................................... 351/41, 51, 52, 47
See application file for complete search history.

(56) References Cited

U.S. PATENT DOCUMENTS

| | | | |
|---|---|---|---|
| 4,715,702 A * | 12/1987 | Dillon | 351/44 |
| 5,440,354 A | 8/1995 | Just | |
| 6,786,593 B2 | 9/2004 | Zelman | |
| 7,097,299 B2 | 8/2006 | Zelman | |
| 7,645,039 B2 | 1/2010 | Sheldon | |
| 7,874,670 B2 | 1/2011 | Buggs et al. | |
| 2004/0036836 A1 * | 2/2004 | Lee | 351/47 |
| 2008/0316420 A1 * | 12/2008 | Agazarova | 351/41 |

* cited by examiner

*Primary Examiner* — William Choi
*Assistant Examiner* — Sharrief Broome
(74) *Attorney, Agent, or Firm* — Paul E. Krieger; JL Salazar Law Firm

(57) ABSTRACT

An eyeglass apparatus for use with an interchangeable character eye overlay includes a base frame adapted to be worn over at least one eye of a wearer and a first attachment mechanism for the base frame for removably attaching a character eye overlay having a cooperating second attachment mechanism.

7 Claims, 2 Drawing Sheets

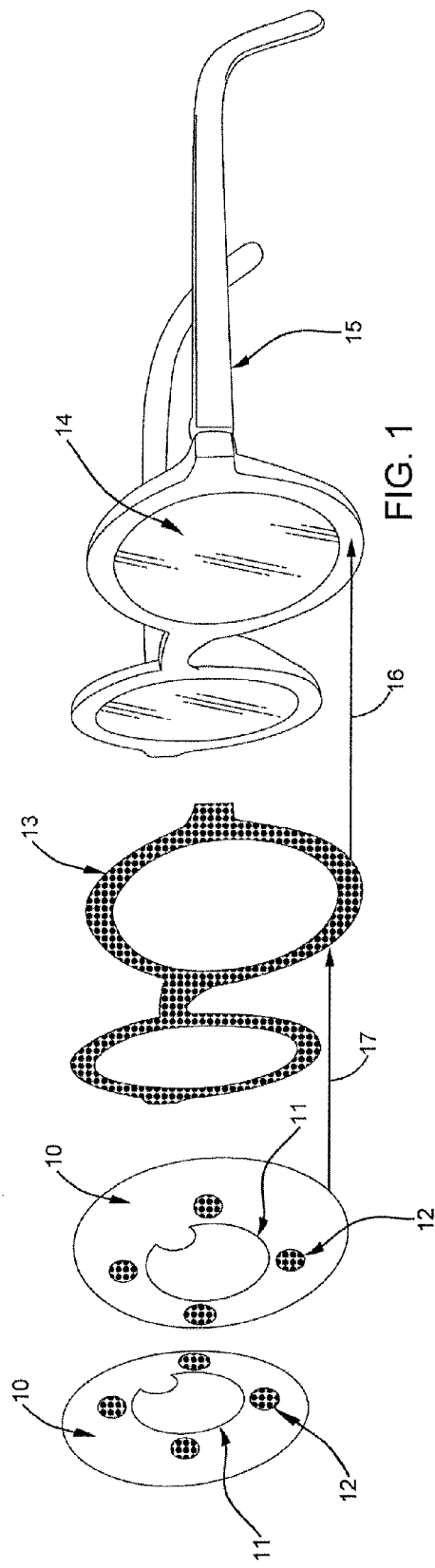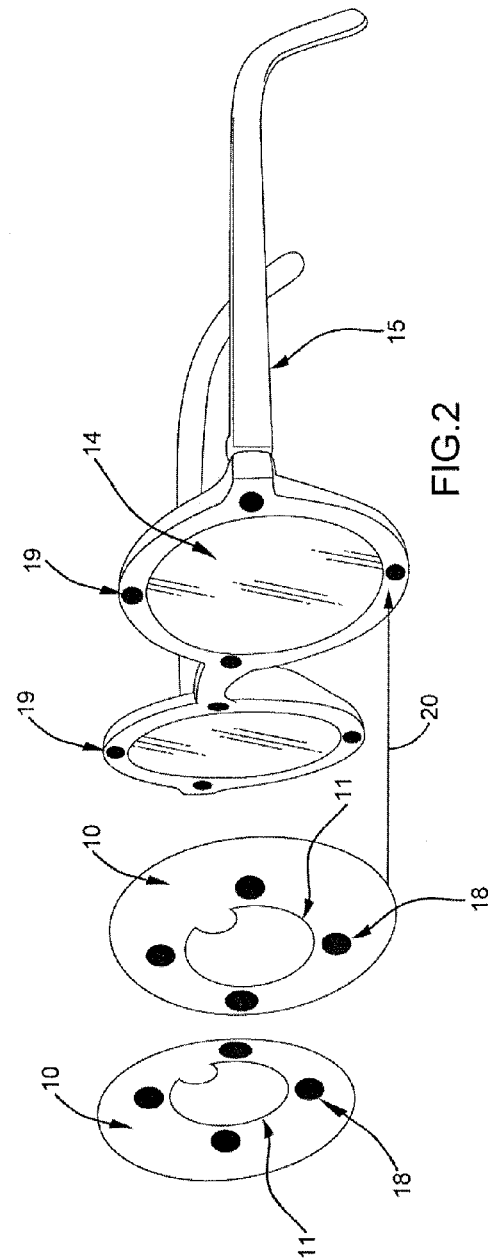

EYEGLASSES WITH INTERCHANGEABLE CHARACTER EYES

TECHNICAL FIELD

This invention relates to eyeglasses and in particular to eyeglasses that can change the wearer into different characters through the use of interchangeable lens overlays.

BACKGROUND OF THE INVENTION

In the field of novelty glasses, whenever a wearer wants to play the role of a different character, a different pair of eyeglasses is typically used for each character having certain eye characteristics. In order to eliminate the need to buy multiple pairs of eyeglasses for different characters it would be advantageous if a base pair of eyeglasses could be provided with multiple interchangeable overlays with different character eyes.

BRIEF SUMMARY OF THE INVENTION

The invention is directed to an eyeglass apparatus for use with interchangeable character eye overlays. The apparatus includes a base frame that is adapted to be worn over at least one eye of a wearer, preferably over both eyes. The base frame has a first attachment mechanism for removably attaching the character eye overlays, which have a cooperating second attachment mechanism The base frame includes a front section with openings coinciding with the eyes of a wearer and paddles for connecting the front section with the ears of a wearer, with non-corrective lenses preferably being mounted in the openings.

The attachment mechanisms can be of any type suitable for removably attaching character eye overlays of various shapes and designs. Such mechanism can includes known hook and loop fasteners sold under the Velcro® trademark, magnets of different polarities or other comparable fasteners that allow the character eye overlays to be easily removed and replaced.

BRIEF DESCRIPTION OF THE DRAWINGS

For a more complete understanding of the present invention, reference is now made to the following descriptions taken in conjunction with the accompanying Pictures and drawings, in which:

FIG. 1 shows a pair of glasses with the hook and loop fastener attachment in accordance with the present invention.

FIG. 2 shows the pair of glasses with magnet attachment in accordance with the present invention.

DETAILED DESCRIPTION OF THE INVENTION

Figure 3:
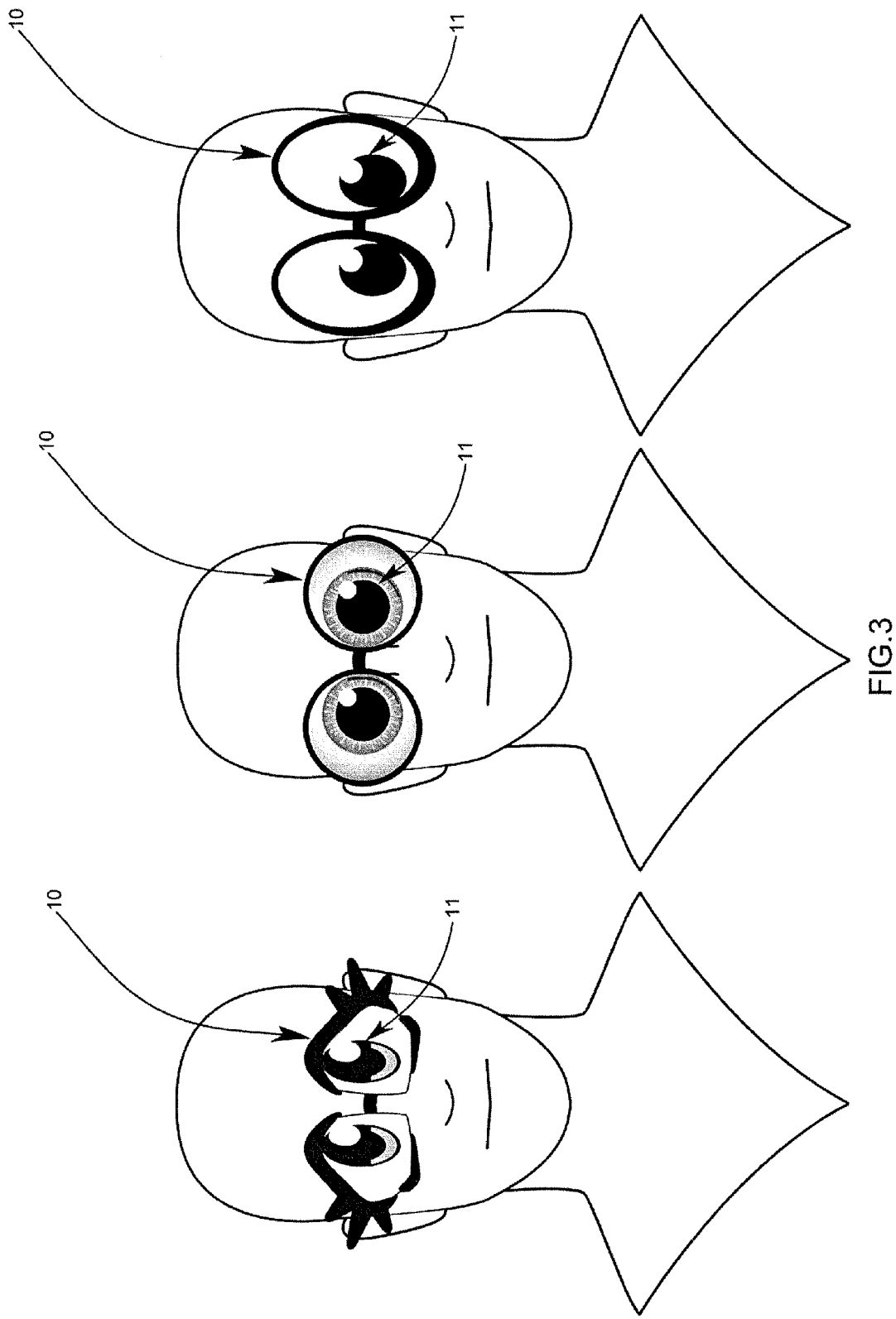
FIG. 3 shows a figure wearing the glasses with different character eyes in accordance with the present invention.

Referring to the drawings, FIG. 1 shows an eyeglass frame 15 with non-corrective lenses 14. The lenses may be clear, or they could have a darkened smoky hue or other color. Alternatively, the eyeglass frame 15 could be provided with no lenses and simply serve as a base frame for the interchangeable character eyes described below. The eyeglass frame 15 preferably has two eye openings as shown, with a front portion in which the eye openings are formed and a pair of earpieces or paddles. However, the invention could be used with a monocle type of eyeglass frame with a single eye opening.

In order to attach the interchangeable character eyes, the eyeglass frame 15 includes an attachment mechanism that allows quick and easily attachment and removal of the character eyes from the frame. One suitable type of attachment mechanism includes a fastener with hook and loop genders, which is sold under the trademark Velcro®. An overlay 13 that includes either one of the hook and loop genders, is glued to the front of the eyeglass frame as shown by the arrow 16.

Character eyes 10 can be formed of a lightweight but durable material such as paper or plastic cardstock, on which various eye shapes can be printed. The character eyes 10 can be formed with dot-shaped portions 20 of the other hook and loop gender glued on the character eyes 10 so that they can easily be attached to the eyeglass frame, as shown by the arrow 17. The character eyes 10 preferably have die cut holes 11 so that the wearer can see through the eyes. These holes can be open or covered with a non-corrective lens formed, for example, of clear plastic. The holes 11 can be shaped to look like the pupil of the wearer, so that when the character eyes are affixed to the eyeglass frame, the eye appears black when the lens 14 has a smoky hue.

Alternatively, instead of using a hook and loop fastener, magnets 18,19, can be used by gluing magnets of one polarity to the eyeglass frame and of the other polarity to the character eyes. Other fasteners having the characteristics described above and which are suitable for attaching the character eyes to the eyeglass frame can also be used.

FIG. 3 shows various types of character eyes on a wearer to illustrate that a number of interchangeable character eyes having different sizes and shapes can be used with a single eyeglass frame. Each one of the character eyes shown in FIG. 3 has printed eyes 10 with holes 11 cut out around the pupil so the wearer can see out of the character eyes. The pupil is shown as being black, which is how they look when lenses with a smoky hue are used in the eyeglass frame.

What is claimed is:

1. An eyeglass apparatus and interchangeable character eye overlay, comprising: a base frame that has at least one opening with a non-corrective tinted lens in the opening, the frame being adapted to be worn over at least one eye of a wearer; a character eye overlay configured to fit over the opening and comprising a novelty design with a solid portion to simulate a pupil of the wearer's eye and a cut out portion that does not block the wearer's vision; and an attachment mechanism comprising cooperating attachment components for the base frame and character eye overlay for removably attaching the character eye overlay to the frame.

2. The eyeglass apparatus of claim 1, wherein the base frame is adapted to be worn over two eyes of the wearer.

3. The eyeglass apparatus of claim 2, wherein the base frame comprises a front section with openings coinciding with the eyes of a wearer and paddles for connecting the front section with the ears of a wearer.

4. The eyeglass apparatus of claim 1, wherein the base frame includes an opening coinciding with at least one eye of the wearer and further comprising a lens in said opening.

5. The eyeglass apparatus of claim 1, wherein the first attachment mechanism comprises a fastening mechanism of the type that has loop and hook portions, one of said hook and loop portions being connected to the base frame.

6. The eyeglass apparatus of claim 1, wherein the first attachment mechanism comprises a fastening mechanism of the type with magnet portions having positive and negative polarities, with a magnet portion having one polarity being connected to the base frame.

7. The eyeglass apparatus of claim 1, and further including a plurality of character eye overlays, each of which includes a second attachment mechanism for cooperating with the first attachment mechanism so that the character eye overlays are interchangeable.

* * * * *